United States Patent
Barkan et al.

(10) Patent No.: US 8,824,502 B2
(45) Date of Patent: *Sep. 2, 2014

(54) LONG-REACH ETHERNET FOR 1000BASE-T AND 10GBASE-T

(75) Inventors: Ozdal Barkan, Mountain View, CA (US); Nafea Bishara, San Jose, CA (US); William Lo, Cupertino, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/585,216

(22) Filed: Aug. 14, 2012

(65) Prior Publication Data

US 2012/0314716 A1    Dec. 13, 2012

Related U.S. Application Data

(63) Continuation of application No. 12/330,823, filed on Dec. 9, 2008, now Pat. No. 8,243,752, which is a continuation-in-part of application No. 11/696,476, filed on Apr. 4, 2007.

(60) Provisional application No. 61/012,810, filed on Dec. 11, 2007.

(51) Int. Cl.
*H04L 12/28* (2006.01)

(52) U.S. Cl.
USPC .......................................................... 370/465

(58) Field of Classification Search
USPC .......................................... 370/375, 465, 282
See application file for complete search history.

(56) References Cited

U.S. PATENT DOCUMENTS

| 4,320,520 A | 3/1982 | Graham |
|---|---|---|
| 4,914,394 A | 4/1990 | Meyer |

(Continued)

FOREIGN PATENT DOCUMENTS

| WO | WO 01/11861 | 2/2001 |
|---|---|---|
| WO | WO 01/11861 A2 | 2/2001 |

(Continued)

OTHER PUBLICATIONS

IEEE Computer Society; IEEE Standard 802.3ab; IEEE Std. 802.3-2002, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 147-249.

(Continued)

*Primary Examiner* — Edan Orgad
*Assistant Examiner* — Emmanuel Maglo

(57) ABSTRACT

A network interface module includes a physical layer module and a data rate module. The physical layer module is configured to transmit first signals to a network device via a cable at a first data rate while conforming to Ethernet baseband characteristics for the first data rate, and at least one of determine a characteristic of the cable, or perform an autonegotiation process with the network device. The data rate module is configured to select a second data rate based on at least one of the characteristic of the cable, or results of the autonegotiation process. The second data rate is slower than the first data rate. The physical layer module is configured to transmit second signals to the network device at the second data rate while conforming to the Ethernet baseband characteristics for the first data rate.

18 Claims, 14 Drawing Sheets

(56) References Cited

U.S. PATENT DOCUMENTS

| | | | |
|---|---|---|---|
| 5,420,512 A | 5/1995 | Spillane et al. | |
| 5,461,318 A | 10/1995 | Borchert et al. | |
| 6,081,523 A | 6/2000 | Merchant | |
| 6,138,080 A | 10/2000 | Richardson | |
| 6,141,352 A | 10/2000 | Gandy | |
| 6,167,029 A | 12/2000 | Ramakrishnan | |
| 6,198,727 B1 | 3/2001 | Wakeley et al. | |
| 6,295,281 B1 | 9/2001 | Itkowsky et al. | |
| 6,377,640 B2 | 4/2002 | Trans | |
| 6,434,716 B1 | 8/2002 | Johnson et al. | |
| 6,438,163 B1 | 8/2002 | Raghavan et al. | |
| 6,448,899 B1 | 9/2002 | Thompson | |
| 6,522,152 B1 | 2/2003 | Tonti et al. | |
| 6,535,983 B1 | 3/2003 | McCormack et al. | |
| 6,600,755 B1 | 7/2003 | Overs et al. | |
| 6,625,116 B1 * | 9/2003 | Schneider et al. | 370/226 |
| 6,694,017 B1 | 2/2004 | Takada | |
| 6,728,216 B1 | 4/2004 | Sterner | |
| 6,775,529 B1 | 8/2004 | Roo | |
| 6,816,505 B1 * | 11/2004 | Sutardja et al. | 370/463 |
| 6,825,672 B1 | 11/2004 | Lo | |
| 6,829,223 B1 | 12/2004 | Richardson et al. | |
| 6,882,661 B1 | 4/2005 | Creedon et al. | |
| 7,005,861 B1 | 2/2006 | Lo et al. | |
| 7,127,481 B1 | 10/2006 | Lam | |
| 7,161,911 B1 * | 1/2007 | Fang et al. | 370/282 |
| 7,203,851 B1 | 4/2007 | Lo et al. | |
| 7,272,114 B1 * | 9/2007 | Barkan | 370/248 |
| 7,286,469 B2 | 10/2007 | Kauschke et al. | |
| 7,317,732 B2 | 1/2008 | Mills et al. | |
| 7,379,422 B2 | 5/2008 | Nation | |
| 7,385,920 B2 | 6/2008 | Zhang | |
| 7,542,415 B2 | 6/2009 | Kang | |
| 7,624,197 B1 | 11/2009 | Lo et al. | |
| 7,688,749 B1 | 3/2010 | Lo et al. | |
| 7,701,861 B1 * | 4/2010 | Barkan | 370/248 |
| 7,961,831 B2 * | 6/2011 | Ran | 375/355 |
| 8,179,910 B2 * | 5/2012 | Diab et al. | 370/401 |
| 8,295,259 B1 * | 10/2012 | Bagchi | 370/338 |
| 8,355,404 B2 * | 1/2013 | Powell et al. | 370/395.53 |
| 8,416,699 B1 * | 4/2013 | Lo | 370/242 |
| 8,553,709 B2 * | 10/2013 | Diab et al. | 370/401 |
| 8,553,720 B2 * | 10/2013 | Bishara et al. | 370/469 |
| 8,699,514 B2 * | 4/2014 | Huff et al. | 370/465 |
| 2001/0038674 A1 | 11/2001 | Trans | |
| 2002/0080884 A1 | 6/2002 | Lee et al. | |
| 2002/0124110 A1 | 9/2002 | Tanaka | |
| 2002/0181633 A1 | 12/2002 | Trans | |
| 2004/0120334 A1 | 6/2004 | Nation | |
| 2004/0258085 A1 | 12/2004 | Costo | |
| 2005/0013250 A1 | 1/2005 | Kauschke et al. | |
| 2005/0015535 A1 | 1/2005 | Lindsay et al. | |
| 2005/0141551 A1 | 6/2005 | McNeil et al. | |
| 2005/0174926 A1 * | 8/2005 | Barrass | 370/201 |
| 2006/0045009 A1 | 3/2006 | Madison et al. | |
| 2006/0215626 A1 | 9/2006 | Ross | |
| 2006/0268709 A1 | 11/2006 | Singla et al. | |
| 2006/0280132 A1 | 12/2006 | Connor | |
| 2007/0002990 A1 * | 1/2007 | Lee et al. | 375/355 |
| 2007/0248024 A1 * | 10/2007 | Conway et al. | 370/252 |
| 2008/0056284 A1 | 3/2008 | Powell et al. | |
| 2008/0069014 A1 | 3/2008 | Powell et al. | |
| 2008/0069144 A1 | 3/2008 | Yu et al. | |
| 2009/0125735 A1 * | 5/2009 | Zimmerman | 713/310 |
| 2009/0245274 A1 | 10/2009 | Hurwitz et al. | |
| 2010/0046521 A1 | 2/2010 | Wong | |
| 2013/0117639 A1 * | 5/2013 | Ganga et al. | 714/776 |

FOREIGN PATENT DOCUMENTS

| | | |
|---|---|---|
| WO | WO 01/11861 A3 | 2/2001 |
| WO | WO 2005/104698 | 11/2005 |
| WO | WO 2006/075928 | 7/2006 |
| WO | WO 2007/054815 | 5/2007 |

OTHER PUBLICATIONS

Intel, "LXT9784 Octal 10/100 Transceiver Hardware Integrity Function Overview" Application Note, Jan. 2001, pp. 3-14.

International Search Report for Application No. PCT/US2008/086450 (corresponding hereto) mailed Mar. 8, 2009.

PCT International Search Report and Written Opinion dated Oct. 29, 2007 for International Application No. PCT/US2007/009573; 14 pages.

U.S. Appl. No. 09/991,043, filed Nov. 21, 2001; Apparatus and Method for Automatic Speed Downshift got a Two Pair Cable; William Lo; 61 pages.

U.S. Appl. No. 60/217,418, filed Jul. 11, 2000; Finite Impulse Response Filter; Yat-Tung Lam; 35 pages.

* cited by examiner

US 8,824,502 B2

LONG-REACH ETHERNET FOR 1000BASE-T AND 10GBASE-T

CROSS-REFERENCE TO RELATED APPLICATIONS

This application is a continuation of U.S. patent application Ser. No. 12/330,823 filed on Dec. 9, 2008, which is a continuation in part of U.S. patent application Ser. No. 11/696,476 filed Apr. 4, 2007. This application claims the benefit of U.S. Provisional Application No. 61/012,810 filed on Dec. 11, 2007. This application is related to U.S. patent application Ser. No. 11/595,053 filed Nov. 10, 2006. The disclosures of the above applications are incorporated herein by reference in their entirety.

FIELD

The present disclosure relates generally to data communications. More particularly, the present disclosure relates to increasing the reach of 1000BASE-T and 10 GBASE-T Ethernet.

BACKGROUND

Data communications using Ethernet over twisted pair, as specified by the IEEE 802.3 10/100/1000/10 GBASE-T standards, is currently limited to a distance of 100 meters. However, new applications have emerged having requirements for distances greater than 100 meters, in addition to data rates exceeding 100 Mbps. For example, multiple-input, multiple-output (MIMO) wireless access points often require Ethernet connections having speeds above 100 Mbps, and are being deployed in locations requiring Ethernet cable lengths greater than 100 meters.

Conventional solutions include changing the number of conductors or cables, changing the signaling used, and the like. However, each of these solutions suffer from problems such as increased complexity, increased semiconductor die area, increased power consumption, and the like.

SUMMARY

In one aspect, a physical-layer device is provided and includes a cable measurement module, a data rate module and a physical-layer device core. The cable measurement module is configured to measure characteristics of a cable. The data rate module is configured to (i) select a data rate divisor N based on the measured characteristics of the cable, and (ii) reduce a rate of a first clock based on the data rate divisor N, where N is at least one of a positive integer greater than 1 or a real number greater than 1. The physical-layer device core includes: a transmit module configured to transmit first signals over the cable at a data rate of M/N Gbps based on the rate of the first clock, where M is a positive integer; and a receive module configured to receive second signals over the cable at the data rate of M/N Gbps based on the rate of the first clock. The first signals and the second signals conform to 1000BASE-T when M=1. The first signals and the second signals conform to 10 GBASE-T when M=10.

In one aspect, a physical-layer device (PHY) is provided and includes: a data rate module to select a data rate divisor N, where N is at least one of a positive integer, or a real number greater than, or equal to, 1; and a PHY core. The PHY core includes a PHY transmit module to transmit first signals a data rate of M/N Gbps, and a PHY receive module to receive second signals at the data rate of M/N Gbps. The first and second signals conform to at least one of 1000BASE-T, where M=1, and 10 GBASE-T, where M=10.

Implementations of the PHY can include one or more of the following features. Some implementations include a cable measurement module to measure one or more characteristics of a cable transporting the first signals and the second signals. The data rate module selects the data rate divisor N based on the one or more characteristics of the cable. In some implementations, the one or more characteristics of the cable include at least one of: a length of the cable; or a signal transmission quality of the cable. Some implementations include a clock reduction circuit to generate a local clock rate based on a reference clock rate. A ratio of the reference clock rate to the local clock rate is N. The PHY core operates according to the local clock rate.

Some implementations include a physical coding sublayer (PCS) transmit module to generate PAM-5 symbols at a symbol rate of 125 Mbaud; and a symbol transmit module to generate a PAM-5 line signal for N consecutive symbol periods for each of the PAM-5 symbols. In some implementations, levels of each generated PAM-5 line signal represent the corresponding PAM-5 symbol. In some implementations, levels of each generated PAM-5 line signal represent interpolations between consecutive ones of the PAM-5 symbols. Some implementations include a cable receive module to generate PAM-5 line signals based on the second signals; and a symbol receive module to generate one PAM-5 symbol for each N consecutive symbol periods of each of the PAM-5 line signals.

Some implementations include a network interface module including: the PHY; and a media access controller to provide first data to the PHY module, and to receive second data from the PHY. In some implementations, the network interface module further includes a first-in first-out buffer (FIFO) to store the first data received from the media access controller; and a flow control circuit to transmit a pause signal to the media access controller when an amount of the first data stored in the FIFO exceeds a predetermined threshold. Some implementations include a network device including the network interface module. In some implementations, the network device is selected from the group consisting of: a network switch; a router; and a network interface controller.

In general, in one aspect, an implementation features a method including: selecting a data rate divisor N, where N is at least one of a positive integer, or a real number greater than, or equal to, 1; transmitting first signals at a data rate of M/N Gbps; and receiving second signals at the data rate of M/N Gbps, where the first and second signals conform to at least one of 1000BASE-T, where M=1, and 10 GBASE-T, where M=10.

Implementations of the method can include one or more of the following features. Some implementations include measuring one or more characteristics of a cable transporting the first signals and the second signals; and selecting the data rate divisor N based on the one or more characteristics of the cable. In some implementations, the one or more characteristics of the cable include at least one of: a length of the cable; or a signal transmission quality of the cable. Some implementations include generating a local clock rate based on a reference clock rate, where a ratio of the reference clock rate to the local clock rate is N; where the first signals are transmitted according to the local clock rate; and where the second signals are received according to the local clock rate.

Some implementations include generating PAM-5 symbols at a symbol rate of 125 Mbaud; and generating a PAM-5 line signal for N consecutive symbol periods for each of the PAM-5 symbols. In some implementations, levels of each generated PAM-5 line signal represent the corresponding PAM-5 symbol. In some implementations, levels of each generated PAM-5 line signal represent interpolations between consecutive ones of the PAM-5 symbols. Some implementations include generating PAM-5 line signals based on the second signals; and generating one PAM-5 symbol for each N consecutive symbol periods of each of the PAM-5 line signals. Some implementations include storing data represented by the first signals in a first-in first-out buffer (FIFO); and transmitting a pause signal when an amount of the data stored in the FIFO exceeds a predetermined threshold.

The details of one or more implementations are set forth in the accompanying drawings and the description below. Other features will be apparent from the description and drawings, and from the claims.

Figure 1:
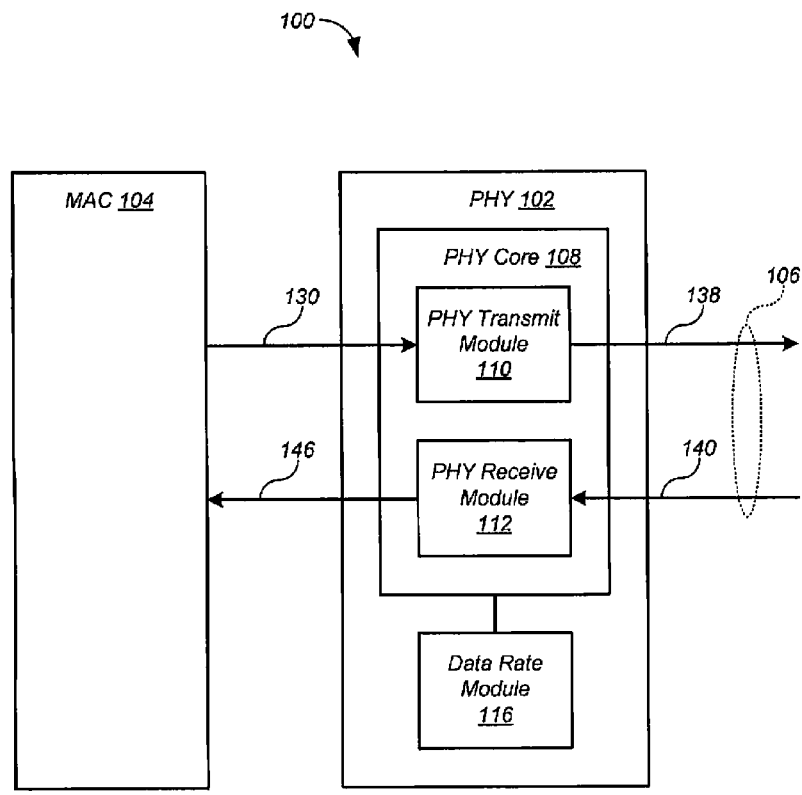
FIG. 1 depicts a data communications system according to the present disclosure.

The leading digit(s) of each reference numeral used in this specification indicates the number of the drawing in which the reference numeral first appears.

DETAILED DESCRIPTION

The subject matter of the present disclosure relates to increasing the reach of 1000BASE-T and 10 GBASE-T Ethernet, that is, to increasing the cable lengths over which 1000BASE-T and 10 GBASE-T Ethernet can operate. According to various implementations disclosed herein, the transmit and receive data rates are reduced while retaining the other aspects of 1000BASE-T and/or 10 GBASE-T such as the physical coding sublayer (PCS), error correction, and signaling schemes, thereby allowing for cable lengths greater than the 100 meters specified for 1000BASE-T and 10 GBASE-T.

FIG. 1 depicts a data communications system 100 according to one implementation. Although in the described implementations, the elements of data communications system 100 are presented in one arrangement, other implementations may feature other arrangements, as will be apparent to one skilled in the relevant arts based on the disclosure and teachings provided herein. For example, the elements of data communications system 100 can be implemented in hardware, software, or combinations thereof. In some implementations, data communications system 100 is otherwise compliant with all or part of IEEE standard 802.3, including draft and approved amendments.

Referring to FIG. 1, data communications system 100 includes a physical-layer device (PHY) 102, a media access controller (MAC) 104, and a cable 106. PHY 102 includes a PHY core 108 and a data rate module 116 to select a data rate divisor N. Data rate divisor N can be selected manually. PHY core 108 includes a PHY transmit module 110 and a PHY receive module 112.

Figure 2:
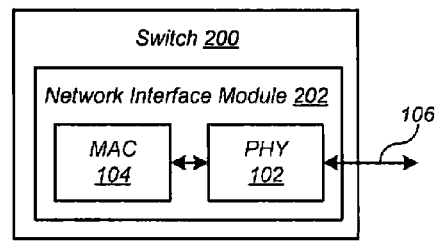
FIG. 2 shows a switch having a network interface module including the PHY and MAC of FIG. 1.
Figure 3:
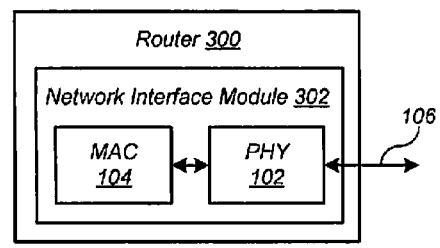
FIG. 3 shows a router having a network interface module including the PHY and MAC of FIG. 1.
Figure 4:
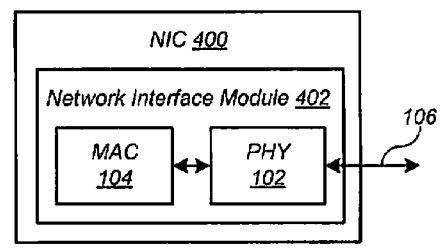
FIG. 4 shows a NIC having a network interface module including the PHY and MAC of FIG. 1.

PHY 102 of FIG. 1 can be implemented in a network interface module. The network interface module can be implemented in a network device such as a switch, router, network interface controller (NIC), and the like. FIG. 2 shows a switch 200 having a network interface module 202 including PHY 102 and MAC 104 of FIG. 1. FIG. 3 shows a router 300 having a network interface module 302 including PHY 102 and MAC 104 of FIG. 1. FIG. 4 shows a NIC 400 having a network interface module 402 including PHY 102 and MAC 104 of FIG. 1.

Figure 5:
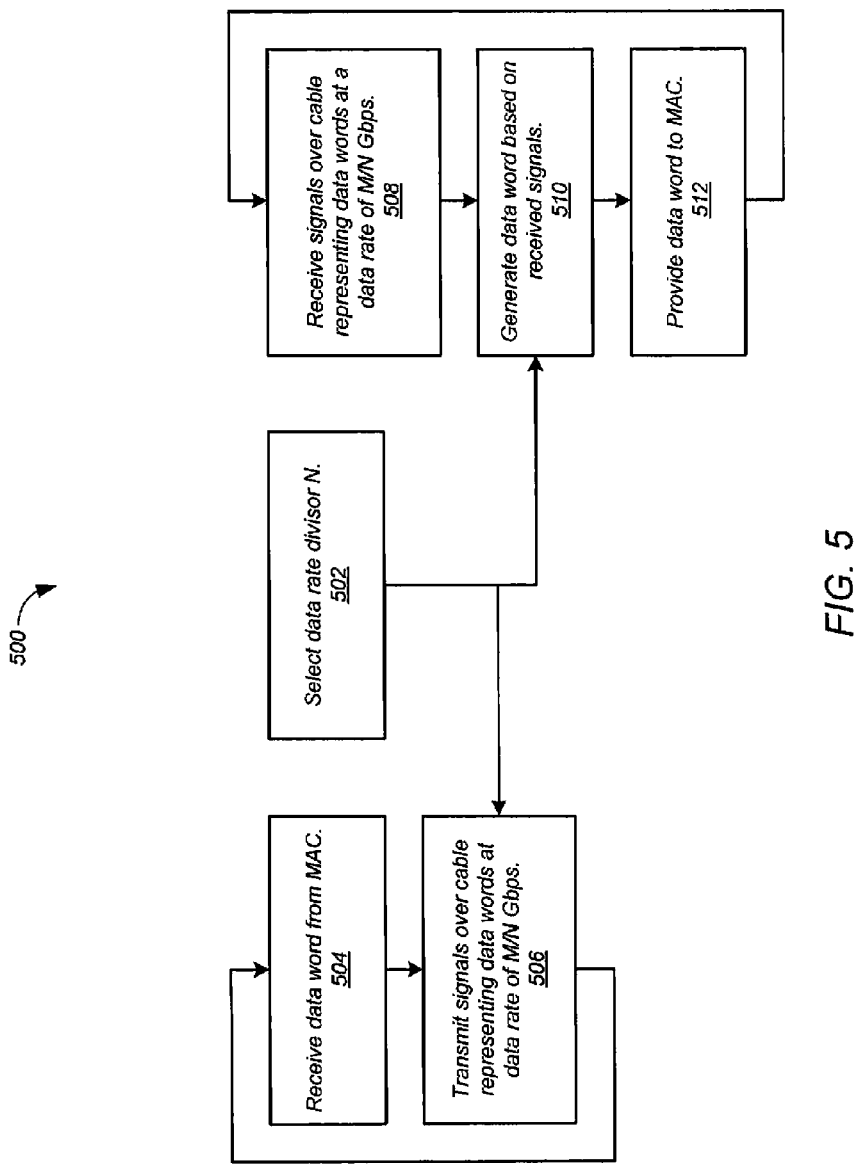
FIG. 5 shows a process for the PHY of FIG. 1.

FIG. 5 shows a process 500 for PHY 102 of FIG. 1 according to one implementation. Although in the described implementations, the elements of process 500 are presented in one arrangement, other implementations may feature other arrangements, as will be apparent to one skilled in the relevant arts based on the disclosure and teachings provided herein. For example, in various implementations, some or all of the steps of process 500 can be executed in a different order, concurrently, and the like.

Referring to FIG. 5, data rate module 116 selects a data rate divisor N (step 502). Data rate divisor N can be a positive integer or a real number greater than, or equal to, 1. Data rate divisor N can be selected manually. For example, data rate divisor can be set in a register in data communication system 100 and the like.

PHY 102 receives data words 130 from MAC 104 (step 504). PHY transmit module transmits signals 138 over cable 106 representing data words 130 at a data rate of M/N Gbps (step 506). For 1000BASE-T, M=1. For 10 GBASE-T, M=10. The effect is to reduce the transmitted data rate from the 1000BASE-T or 10 GBASE-T data rate by a factor of N.

PHY receive module 112 receives signals 140 over cable 106 representing data words 146 at a data rate of M/N Gbps (step 508). For 1000BASE-T, M=1. For 10 GBASE-T, M=10. PHY 102 generates data words 146 based on signals 140 (step 510), and provides data words 146 to MAC 104 (step 512). The effect is to accommodate a received data rate reduced from the 1000BASE-T or 10 GBASE-T data rate by a factor of N.

Figure 6:
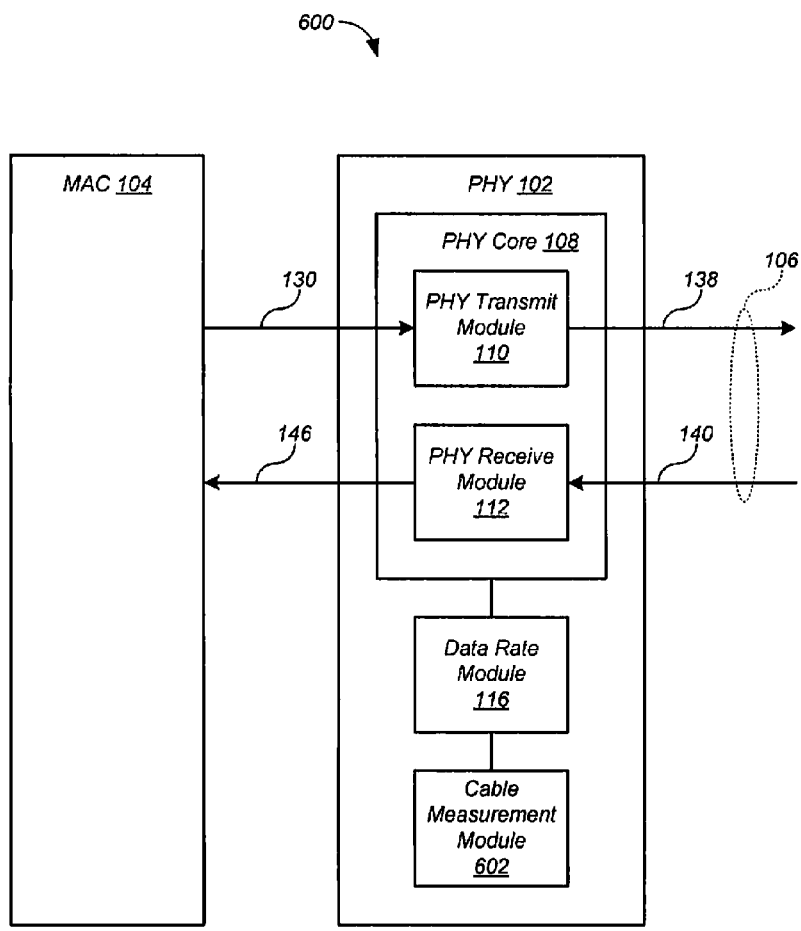
FIG. 6 shows the data communications system of FIG. 1 with the addition of a cable measurement module to the PHY.

In some implementations, data rate module 116 selects data rate divisor N based on one or more characteristics of cable 106. FIG. 6 shows the data communications system 100 of FIG. 1 with the addition of a cable measurement module 602 to PHY 102.

Figure 7:
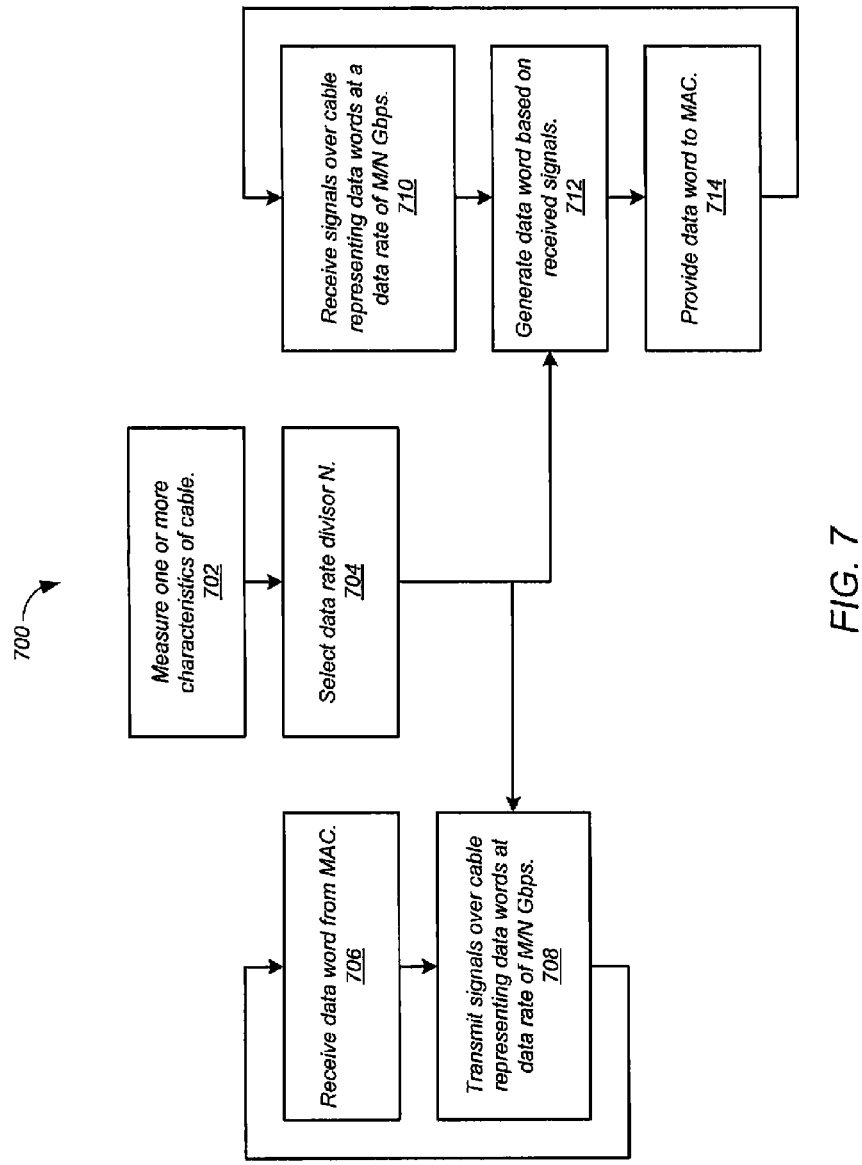
FIG. 7 shows a process for the PHY of FIG. 6.

FIG. 7 shows a process 700 for PHY 102 of FIG. 6 according to one implementation. Referring to FIG. 7, cable measurement module 602 of PHY 102 measures one or more characteristics of cable 106 (step 702). The characteristics measured by cable measurement module 602 can include a length of cable 106, a signal transmission quality of cable 106, and the like. Techniques for measuring a length of cable 106 are disclosed in U.S. patent application Ser. No. 11/595,053 filed Nov. 10, 2006, the disclosure thereof incorporated by reference herein in its entirety. Measurements of a signal transmission quality of cable 106 can include measurements of the "eye" opening of signals received over cable 106 by cable receive module 128 and the like.

Based on the measured characteristics of cable 106, data rate module 116 of PHY 102 selects a data rate divisor N (step 704). Data rate divisor N can be a positive integer or a real number greater than, or equal to, 1. Data rate divisor N can be selected manually. For example, data rate divisor can be set in a register in data communication system 100 and the like.

Alternatively, data rate divisor N can be selected using an autonegotiation process. For example, the autonegotiation process can include IEEE nextPage autonegotiation, high-level software such as Link Layer Discovery Protocol (LLDP), and the like. One example autonegotiation process is described below.

PHY 102 receives data words 130 from MAC 104 (step 706). PHY transmit module transmits signals 138 over cable 106 representing data words 130 at a data rate of M/N Gbps (step 708). For 1000BASE-T, M=1. For 10 GBASE-T, M=10. The effect is to reduce the transmitted data rate from the 1000BASE-T or 10 GBASE-T data rate by a factor of N.

PHY receive module 112 receives signals 140 over cable 106 representing data words 146 at a data rate of M/N Gbps (step 710). For 1000BASE-T, M=1. For 10 GBASE-T, M=10. PHY 102 generates data words 146 based on signals 140, and provides data words 146 to MAC 104 (step 712). The effect is to accommodate a received data rate reduced from the 1000BASE-T or 10 GBASE-T data rate by a factor of N.

Figure 8:
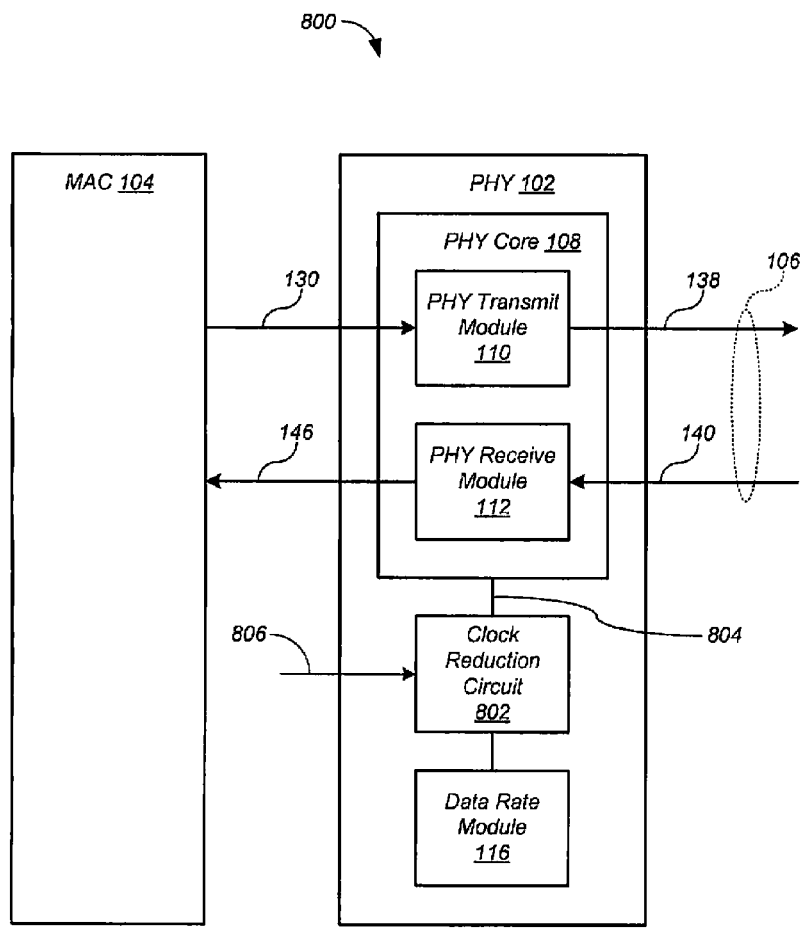
FIG. 8 shows the data communications system of FIG. 1 with the addition of a clock reduction circuit to the PHY.

PHY 102 operates according to a local clock. In some implementations, data rate divisor N is used to slow the local clock for PHY 102. In these implementations, PHY core 108, including both analog and digital sections, is slowed by a factor of N. The effect is to reduce the transmitted data rate by a factor of N, and to accommodate a received data rate reduced by a factor of N. FIG. 8 shows the data communications system 100 of FIG. 1 with the addition of a clock reduction circuit 802 to PHY 102.

Figure 9:
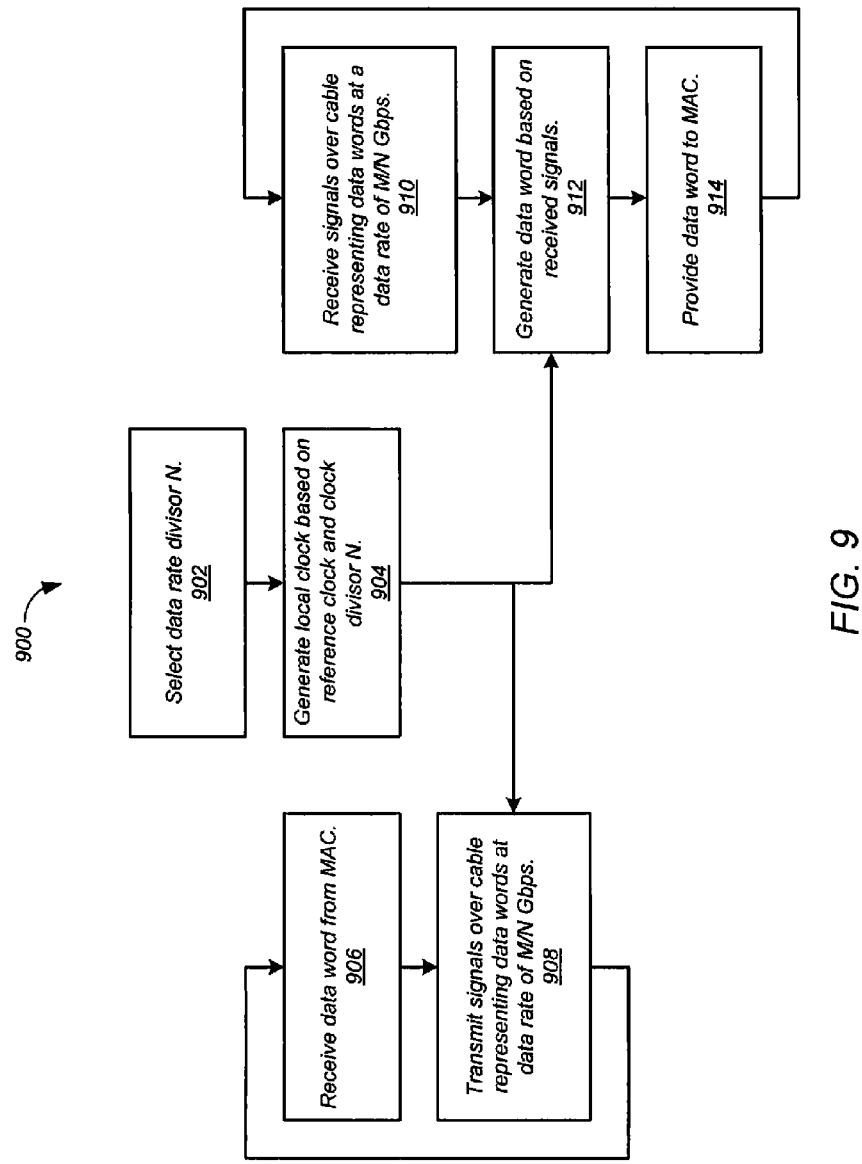
FIG. 9 shows a process for the PHY of FIG. 8.

FIG. 9 shows a process 900 for PHY 102 of FIG. 8 according to one implementation. Referring to FIG. 9, data rate module 116 selects a data rate divisor N (step 902). Data rate divisor N can be a positive integer or a real number greater than, or equal to, 1. Data rate divisor N can be selected manually. For example, data rate divisor can be set in a register in data communication system 100 and the like. Alternatively, data rate module 116 can select data rate divisor N based on one or more characteristics of cable 106, as described above with reference to FIGS. 6 and 7.

Clock reduction circuit 802 generates a local clock 804 based on a reference clock 806 and clock divisor N, where the ratio of the reference clock rate to the local clock rate is N (step 904). PHY 102 operates according to local clock 804. Reference clock 806 can be a 125 MHz GMII clock or the like.

PHY 102 receives data words 130 from MAC 104 (step 906). PHY transmit module transmits signals 138 over cable 106 representing data words 130 at a data rate of M/N Gbps (step 908). For 1000BASE-T, M=1. For 10 GBASE-T, M=10. The effect is to reduce the transmitted data rate from the 1000BASE-T or 10 GBASE-T data rate by a factor of N.

PHY receive module 112 receives signals 140 over cable 106 representing data words 146 at a data rate of M/N Gbps (step 910). For 1000BASE-T, M=1. For 10 GBASE-T, M=10. PHY 102 generates data words 146 based on signals 140 (step 912), and provides data words 146 to MAC 104 (step 914). The effect is to accommodate a received data rate reduced from the 1000BASE-T or 10 GBASE-T data rate by a factor of N.

Figure 10:
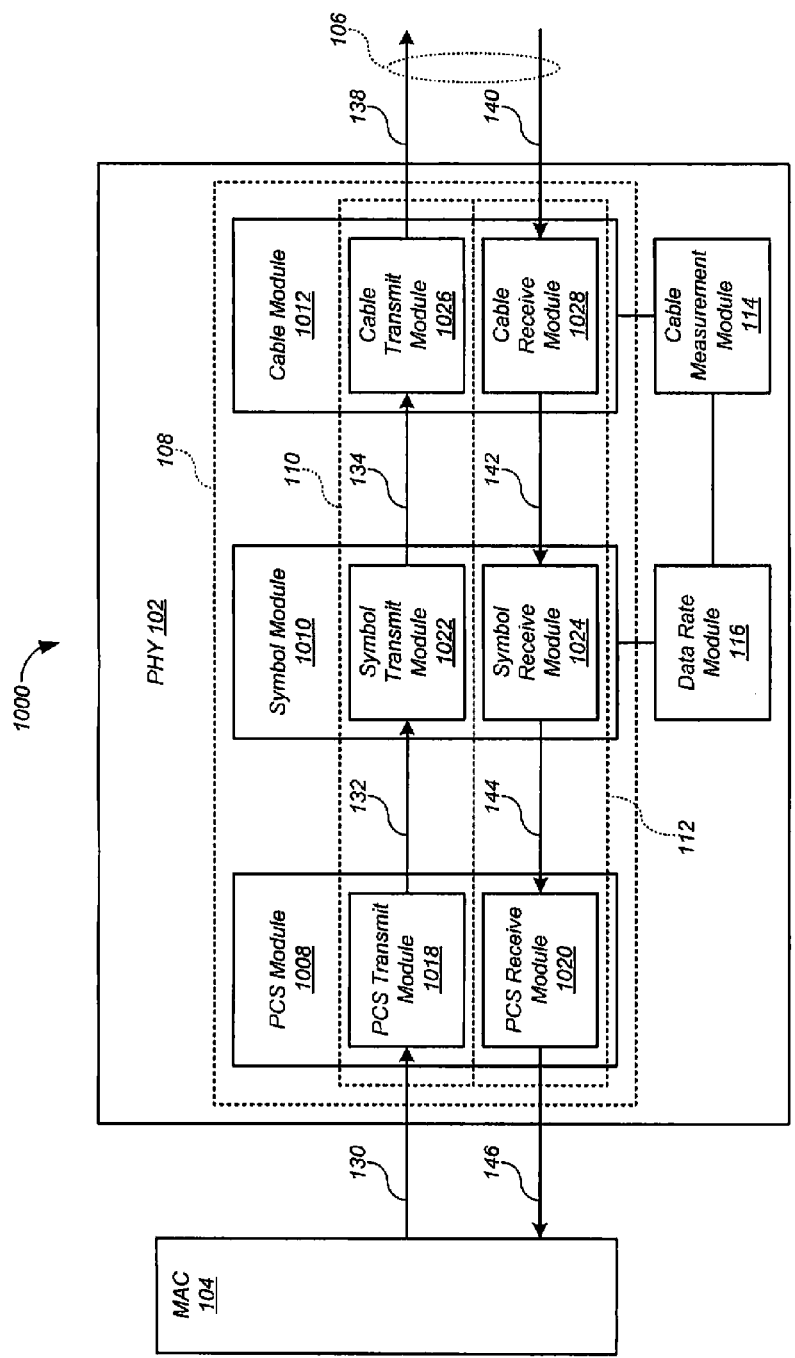
FIG. 10 depicts a 1000BASE-T data communications system according to the present disclosure.

In some 1000BASE-T implementations, digital mechanisms within PHY core 108 are employed to reduce the transmit and receive data rates. FIG. 10 depicts a 1000BASE-T data communications system 1000 according to one implementation. Although in the described implementations, the elements of data communications system 1000 are presented in one arrangement, other implementations may feature other arrangements, as will be apparent to one skilled in the relevant arts based on the disclosure and teachings provided herein. For example, the elements of data communications system 1000 can be implemented in hardware, software, or combinations thereof. In some implementations, data communications system 1000 is otherwise compliant with all or part of IEEE standard 802.3, including draft and approved amendments. Furthermore, while these implementations are described with reference to 1000BASE-T Ethernet, they are easily extended to 10 GBASE-T Ethernet Referring to FIG. 10, data communications system 1000 includes physical-layer device (PHY) 102, media access controller (MAC) 104, and cable 106. PHY 102 includes PHY core 108, cable measurement module 114, and data rate module 116. PHY core 108 includes a physical coding sublayer (PCS) module 1008 in communication with MAC 104, a symbol module 1010 in communication with PCS module 1008, and a cable module 1012 in communication with symbol module 1010, and with a link partner (not shown) over cable 106.

PCS module 1008 includes a PCS transmit module 1018 and a PCS receive module 1020. Symbol module 1010 includes a symbol transmit module 1022 and a symbol receive module 1024. Cable module 1012 includes a cable transmit module 1026 and a cable receive module 1028. PCS transmit module 1018, symbol transmit module 1022, and cable transmit module 1026 are referred to collectively as PHY transmit module 110. PCS receive module 1020, symbol receive module 1024, and cable receive module 1028 are referred to collectively as PHY receive module 112.

Figure 11:
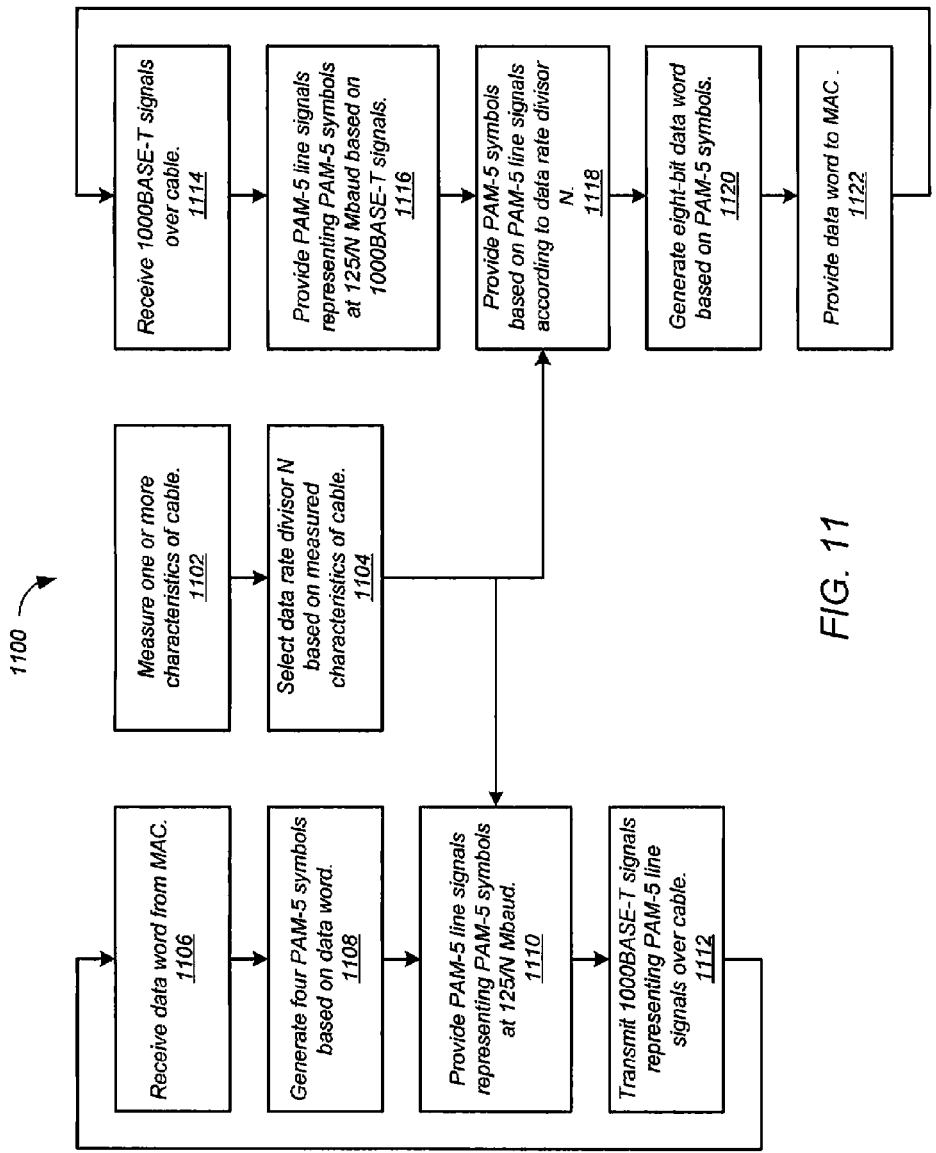
FIG. 11 shows a process for the PHY of FIG. 10.

FIG. 11 shows a process 1100 for PHY 102 of FIG. 10 according to one implementation. Although in the described implementations, the elements of process 1100 are presented in one arrangement, other implementations may feature other arrangements, as will be apparent to one skilled in the relevant arts based on the disclosure and teachings provided herein. For example, in various implementations, some or all of the steps of process 1100 can be executed in a different order, concurrently, and the like.

Referring to FIG. 11, cable measurement module 114 of PHY 102 measures one or more characteristics of cable 106 (step 1102). The characteristics measured by cable measurement module 114 can include a length of cable 106, a signal transmission quality of cable 106, and the like. Techniques for measuring a length of cable 106 are disclosed in U.S. patent application Ser. No. 11/595,053 filed Nov. 10, 2006, the disclosure thereof incorporated by reference herein in its entirety. Measurements of a signal transmission quality of cable 106 can include measurements of the "eye" opening of signals received over cable 106 by cable receive module 128 and the like.

Based on the measured characteristics of cable 106, data rate module 116 of PHY 102 selects a data rate divisor N (step 1104). In some implementations, N is a positive integer. In some implementations, N is a real number greater than, or equal to, 1. In one implementation, data rate module 116 selects data rate divisor N based on a length of cable 106 measured by cable measurement module 114. For example, when the length of cable 106 does not exceed the maximum length of 100 meters specified by 1000BASE-T, data rate module 116 can select a data rate divisor of N=1, resulting in the 1000BASE-T data rate of 1 Gbps. When the length of cable 106 exceeds 100 meters, data rate module 116 can select a larger value for N. In one implementation, the selectable data rate divisors include N=1, N=10, and N=100, resulting in data rates of 1 Gbps, 100 Mbps, and 10 Mbps, respectively. In other implementations, any data rate can be selected. For example, for a cable length of 300 meters, a data rate of 500 Mbps can be selected.

In another implementation, data rate module 116 selects data rate divisor N based on a signal transmission quality of cable 106 measured by cable measurement module 114. For example, when a measure of the signal transmission quality exceeds a first predetermined threshold, data rate module 116 can select a data rate divisor of N=1, resulting in the 1000BASE-T data rate of 1 Gbps. When the signal transmission quality is degraded, data rate module 116 can select a larger value for N.

On the transmit side, PCS module 1008 of PHY 102 receives eight-bit data words 130 from MAC 104 (step 1106). Based on each eight-bit data word 130, PCS transmit module 1018 generates four three-bit pulse-amplitude modulation (PAM-5) symbols 132 (step 1108). Based on PAM-5 symbols 132, and the selected data rate divisor N, symbol transmit module 1022 of symbol module 1010 provides PAM-5 line signals 134 (step 1110), where PAM-5 line signals 134 represent PAM-5 symbols 132 at 125/N Mbaud, as described in detail below. Cable transmit module 1026 of cable module 1012 transmits 1000BASE-T signals 138 over cable 106 (step 1112), where 1000BASE-T signals 138 represent PAM-5 line signals 134. The result is that PHY 102 conveys data 130 at a data rate of 1/N Gbps using 1000BASE-T signaling.

On the receive side, cable module 1012 receives 1000BASE-T signals 140 over cable 106 (step 1114). Based on 1000BASE-T signals 140, cable receive module 1028 of cable module 1012 provides PAM-5 line signals 142 (step 1116). Symbol receive module 1024 of symbol module 1010 provides PAM-5 symbols 144 based on PAM-5 line signals 142 (step 1118), where PAM-5 line signals 142 represent PAM-5 symbols 144 at 125/N Mbaud. PCS receive module 1020 of PCS module 1008 generates eight-bit data words 146 based on PAM-5 symbols 144 (step 1120), and provides data words 146 to MAC 104 (step 1122). The result is that PHY 102 receives data 146 at a data rate of 1/N Gbps using 1000BASE-T signaling.

Figure 12:
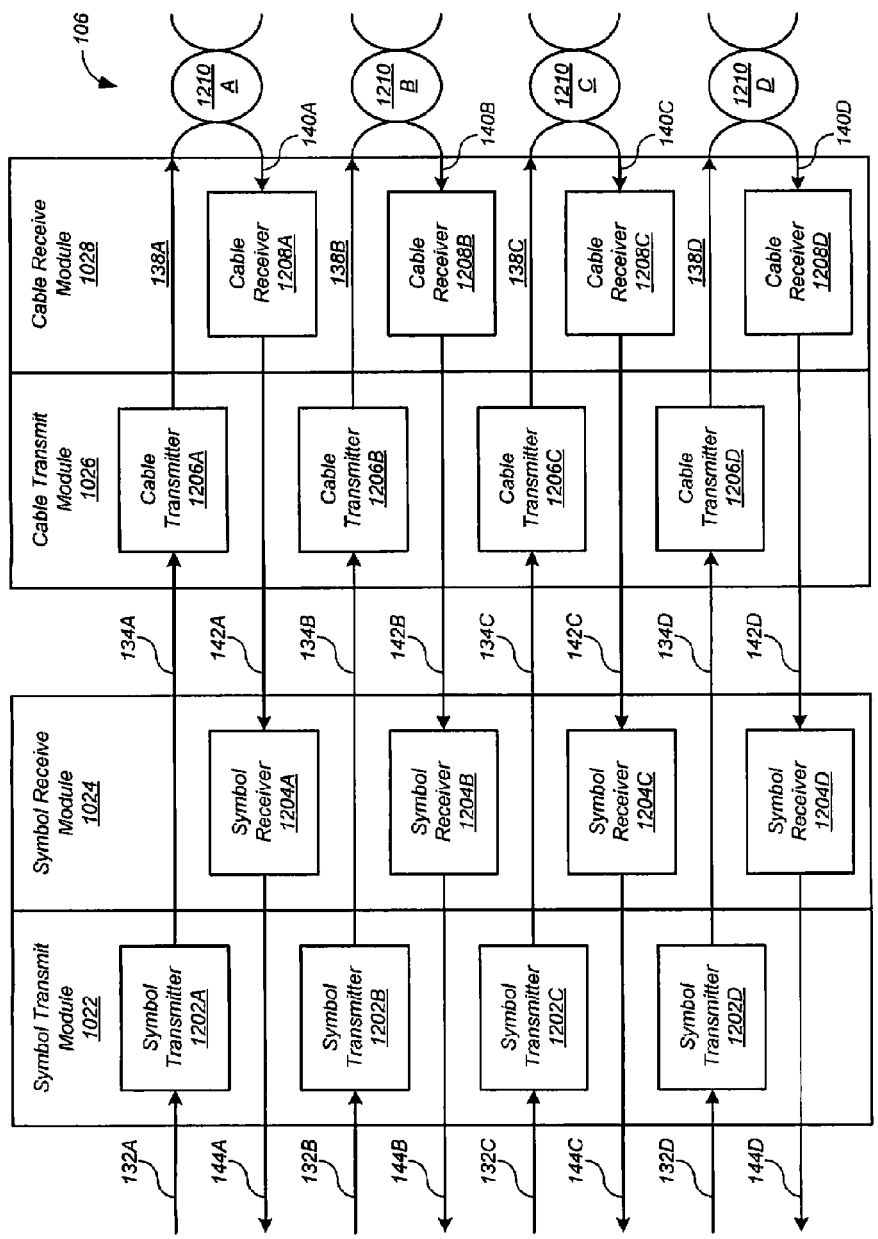
FIG. 12 depicts further detail of the PHY of FIG. 11.

FIG. 12 depicts further detail of PHY 102 of FIG. 11 according to one implementation. Although in the described implementations, the elements of PHY 102 are presented in one arrangement, other implementations may feature other arrangements, as will be apparent to one skilled in the relevant arts based on the disclosure and teachings provided herein. For example, the elements of PHY 102 can be implemented in hardware, software, or combinations thereof.

Referring to FIG. 12, symbol transmit module 1022 of symbol module 1010 includes four symbol transmitters 1202A-D, while symbol receive module 1024 of symbol module 1010 includes four symbol receivers 1204A-D. Cable transmit module 1026 of cable module 1012 includes four cable transmitters 1206A-D, while cable receive module 1028 of cable module 1012 includes four cable receivers 1208A-D. Cable 106 includes four twisted pairs 1210A-D of copper wire.

On the transmit side, based on each eight-bit data word 130 received from MAC 104, PCS transmit module 1018 provides four three-bit PAM-5 symbols 132A-D to symbol transmitters 1202A-D, respectively. The correspondence between PAM-5 symbols and PAM-5 line signal levels is shown in Table 1 below. Based on PAM-5 symbols 132, and the selected data rate divisor N, each symbol transmitter 1202A-D provides a respective PAM-5 line signal 134A-D to a respective cable transmitter 1206A-D. PAM-5 line signals 134A-D represent PAM-5 symbols 132A-D at 125/N Mbaud. Based on PAM-5 line signals 134, each cable transmitter 1206A-D provides a 1000BASE-T signal 138A-D over a twisted pair 1210A-D of cable 106, respectively.

TABLE 1

| PAM-5 Symbol | PAM-5 Line Signal Level |
|---|---|
| 000 | 0 |
| 001 | +1 |
| 010 | +2 |
| 011 | −1 |
| 100 | 0 |
| 101 | +1 |
| 110 | −2 |
| 111 | −1 |

On the receive side, cable receivers 1208A-D receive 1000BASE-T signals 140A-D over twisted pairs 1210A-D of cable 106, respectively. Based on 1000BASE-T signals 140, cable receivers 1208A-D provide PAM-5 line signals 142A-D to symbol receivers 1204A-D, respectively. Based on PAM-5 line signals 142, symbol receivers 1204A-D generate PAM-5 symbols 144A-D, respectively. PAM-5 line signals 142 represent PAM-5 symbols 144 at 125/N Mbaud. Based on each group of four PAM-5 symbols 144A-D, PCS receive module 1020 provides an eight-bit data word 146 to MAC 104.

Figure 13:
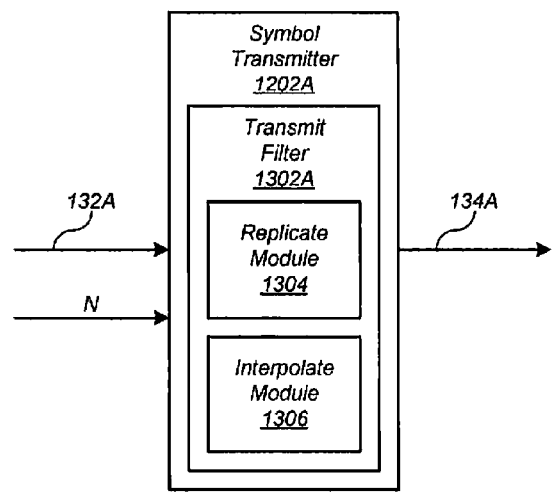
FIG. 13 shows detail of the symbol transmitter of FIG. 12.

FIG. 13 shows detail of symbol transmitter 1202A of FIG. 12 according to one implementation. Symbol transmitters 1202B-D can be implemented in a similar manner. Although in the described implementations, the elements of symbol transmitter 1202A are presented in one arrangement, other implementations may feature other arrangements, as will be apparent to one skilled in the relevant arts based on the disclosure and teachings provided herein. For example, the elements of symbol transmitter 1202A can be implemented in hardware, software, or combinations thereof.

Referring to FIG. 13, symbol transmitter 1202A includes a transmit filter 1302A. For each PAM-5 symbol 132A received from PCS transmit module 1018, transmit filter 1302A generates corresponding PAM-5 line signals 134A for N 1000BASE-T symbol periods, where N is the selected data rate divisor, and the 1000BASE-T symbol period is 8 ns. For full data rate operation of 1 Gbps, N=1. The value of N can be provided by data rate module 116, or can be implemented as clock reduction circuit 802 of FIG. 8.

In some implementations, transmit filter 1302A includes a replicate module 1304. Replicate module 1304 generates the levels of PAM-5 line signals 134A to represent each PAM-5 symbol 132A for the corresponding N 1000BASE-T symbol periods. This technique effectively provides N consecutive replicas of each PAM-5 symbol 132A, thereby reducing the 1000BASE-T data rate by a factor of N.

In some implementations, transmit filter 1302A includes an interpolate module 1306. Interpolate module 1306 generates the levels of PAM-5 line signals 134A to represent interpolations between consecutive PAM-5 symbols 132A for the corresponding N 1000BASE-T symbol periods. These interpolations also reduce the 1000BASE-T data rate by a factor of N, and produce a smoother curve for transmission.

Figure 14:
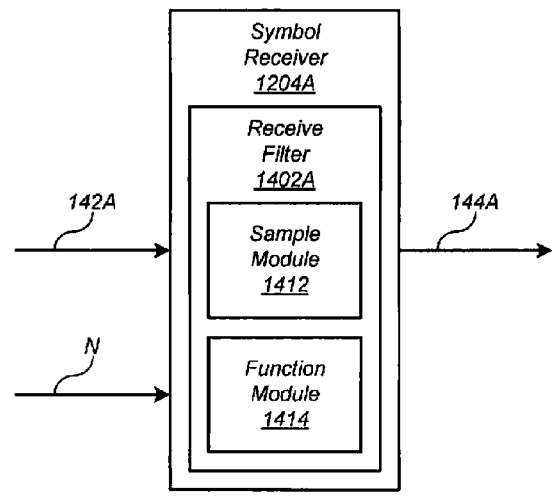
FIG. 14 shows detail of the symbol receiver of FIG. 12.

FIG. 14 shows detail of symbol receiver 1204A of FIG. 12 according to one implementation. Symbol receivers 1204B-D can be implemented in a similar manner. Although in the described implementations, the elements of symbol receiver 1204A are presented in one arrangement, other implementations may feature other arrangements, as will be apparent to one skilled in the relevant arts based on the disclosure and teachings provided herein. For example, the elements of symbol receiver 1204A can be implemented in hardware, software, or combinations thereof.

Referring to FIG. 14, symbol receiver 1204A includes a receive filter 1402A. Receive filter 1402A generates one PAM-5 symbol 144A for each N 1000BASE-T symbol periods of PAM-5 line signal 142A, where N is the selected data rate divisor N. For full data rate operation of 1 Gbps, N=1. The value of N can be provided by data rate module 116, or can be implemented as clock reduction circuit 802 of FIG. 8.

In some implementations, receive filter 1402A includes a sample module 1412. Receive filter 1402A can generate an internal PAM-5 symbol for each 1000BASE-T symbol period based on PAM-5 line signals 142A, and then sample module 1412 can provide every Nth internal PAM-5 symbol to PCS module 1008 as PAM-5 symbol 144A.

In some implementations, receive filter 1402A includes a function module 1414. Function module 1414 generates each PAM-5 symbol 144A as a function of the levels of PAM-5 line signals 142A over N 1000BASE-T symbol periods. For example, each PAM-5 symbol 144A can be generated based on the average of the levels of PAM-5 line signals 142A over N 1000BASE-T symbol periods. Other functions are contemplated.

Referring again to FIG. 1, various techniques can be used to allow MAC 104 to operate with PHY 102 while PHY 102 is operating at a reduced data rate. For example, MAC 104 can adjust its clock rate according to the selected data rate divisor N.

In a 1000BASE-T example, PHY 102 can operate at a selected data rate of 100 Mbps while MAC 104 operates at the 100 Mbps GMII data rate. The advantage of this approach over standard 100BASE-TX is that performance can exceed the performance of 100BASE-TX when the length of cable 106 exceeds 100 meters.

As another example, MAC 104 can employ data word replication to reduce the effective rate of data transfer to PHY 102. According to such implementations, the link between MAC 104 and PHY 102 runs at full speed (that is, 1 Gbps for 1000BASE-T and 10 Gbps for 10 GBASE-T), and MAC 104 transmits each data word to PHY 102 N times, resulting in an effective data rate of 1/N Gbps for 1000BASE-T and 10/N Gbps for 10 GBASE-T.

As another example, PHY 102 and MAC 104 can employ flow control in order to operate at different data rates. This technique allows MAC 104 to receive data from a host at standard GMII data rates of 1000 Mbps, 100 Mbps, etc., while PHY 102 can operate at other data rates.

Figure 15:
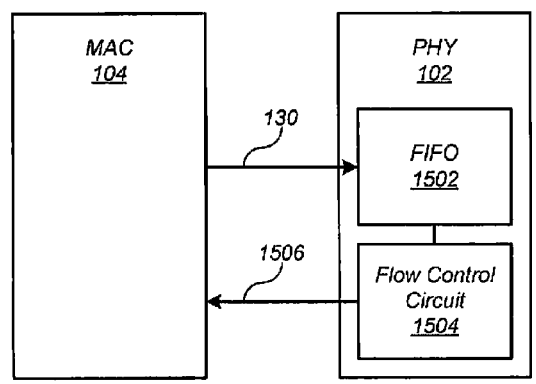
FIG. 15 shows a simplified view of the MAC and PHY of FIG. 1 according to an implementation employing in-band flow control.

In some implementations, MAC 104 and PHY 102 employ out-of-band flow control. For example, PHY 102 can provide flow control signals to MAC 104 using one or more dedicated pins. In other implementations, MAC 104 and PHY 102 employ in-band flow control. FIG. 15 shows a simplified view of MAC 104 and PHY 102 of FIG. 1 according to an implementation employing in-band flow control.

Referring to FIG. 15, PHY 102 includes a first first-in first-out buffer (FIFO) 1502 to store data 130 received from MAC 104, and a flow control circuit 1504 to transmit a pause signal 1506 to MAC 104 when an amount of data 130 stored in the FIFO 1502 exceeds a predetermined threshold. Further detail of such flow control techniques are disclosed in U.S. patent application Ser. No. 11/696,476 filed Apr. 4, 2007, the disclosure thereof incorporated by reference herein in its entirety.

In implementations where cable length is used to select data rates, it can be expected that both link partners will obtain similar cable length measurements, and so will select the same data rate for communication. However, when signal transmission quality is used to select data rates, link partners might obtain different measurements of signal quality. In these implementations, link partners can employ in-band signaling to ensure that both link partners select the same data rate.

Figure 16:
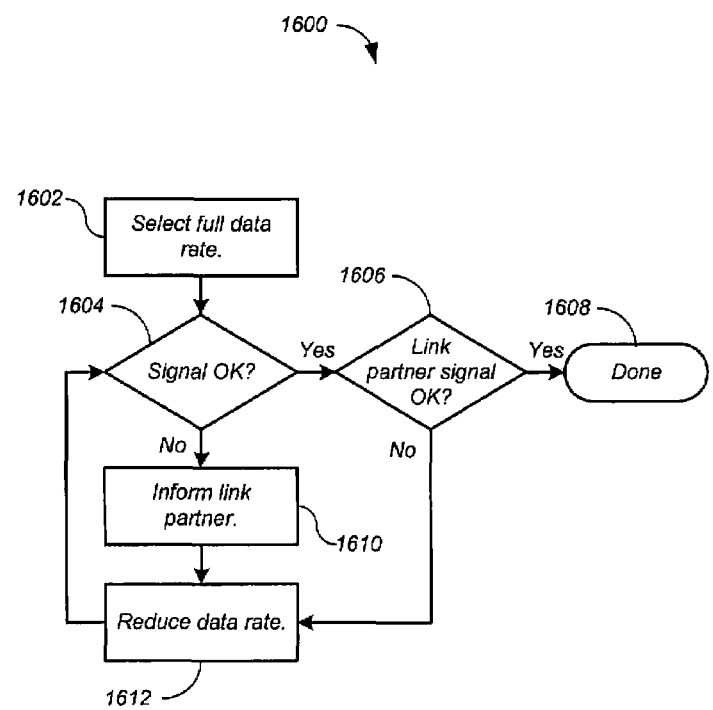
FIG. 16 shows an in-band signaling process for the PHY of FIG. 1.

FIG. 16 shows an in-band signaling process 1600 for PHY 102 of FIG. 1 according to one implementation. The link partner of PHY 102 can employ a similar process. Although in the described implementations, the elements of process 1600 are presented in one arrangement, other implementations may feature other arrangements, as will be apparent to one skilled in the relevant arts based on the disclosure and teachings provided herein. For example, in various implementations, some or all of the steps of process 1600 can be executed in a different order, concurrently, and the like.

Referring to FIG. 16, PHY 102 initially selects the full data rate of 1 Gbps (step 1602). If the signal quality is sufficient (step 1604), and the link partner reports sufficient signal quality (step 1606), process 1600 ends (step 1608). But if the signal quality is not sufficient (step 1604), PHY 102 informs the link partner (step 1610) and reduces the data rate by a predetermined amount (step 1612) before checking signal quality again (step 1604). In addition, if the link partner reports insufficient signal quality (step 1606), PHY 102 reduces the data rate (step 1612) and checks signal quality again (step 1604).

Figure 17:
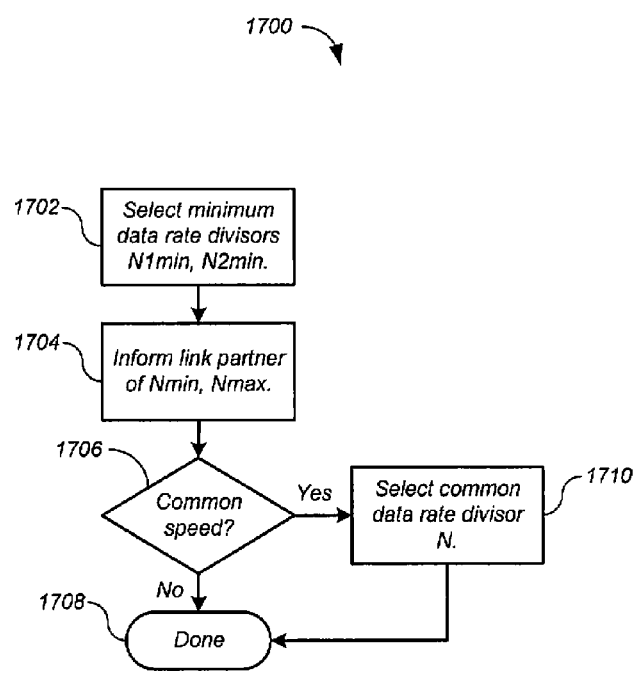
FIG. 17 shows an autonegotiation process for the PHY of FIG. 1.

FIG. 17 shows an autonegotiation process 1600 for PHY 102 of FIG. 1 according to one implementation. The link partner of PHY 102 can employ a similar process. Although in the described implementations, the elements of process 1700 are presented in one arrangement, other implementations may feature other arrangements, as will be apparent to one skilled in the relevant arts based on the disclosure and teachings provided herein. For example, in various implementations, some or all of the steps of process 1700 can be executed in a different order, concurrently, and the like.

Referring to FIG. 17, PHY 102 and its link partner selects a minimum data rate divisor N1min (Step 1702), which represents the maximum speed PHY 102 can support. For example, PHY 102 can employ the techniques described above for selecting a data rate divisor N. The link partner also selects a minimum data rate divisor N2min.

PHY 102 has a predetermined minimum supported speed represented by a maximum data rate divisor N1max. The link partner also has a predetermined minimum supported speed represented by a maximum data rate divisor N2max. During autonegotiation, PHY 102 and its link partner inform each other of their values of Nmin and Nmax (step 1704).

If (N1max<N2min) or (N2max<N1min) (step 1706), then there is no common speed, and process 1700 ends (step 1708). Otherwise, PHY 102 and its link partner both select a common data rate divisor N as the greater of N1min and N2min as (step 1710). The process 1700 ends (step 1708).

Various techniques disclosed herein can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, it will be understood that various modifications may be made without departing from the scope of the disclosure. Accordingly, other implementations are within the scope of the following claims.

What is claimed is:

1. A network interface module comprising:
a physical layer module configured to
receive a first signal from a medium access controller,
transmit the first signal, via one of a plurality of wires of a cable, to a network device at a first data rate while conforming to Ethernet baseband characteristics for the first data rate, and
determine a characteristic of the cable;
a cable measurement module configured to measure characteristics of the cable including the characteristic of the cable determined by the physical layer module, wherein the measured characteristics of the cable comprise
a length of the cable,
a signal quality level of a second signal received via the cable, and
a measurement of an eye opening of the second signal received via the cable; and
a data rate module configured to select a second data rate based on the measured characteristics of the cable, wherein the second data rate is slower than the first data rate, and
wherein the physical layer module is configured to transmit a third signal, via the one of the plurality of wires of the cable, to the network device at the second data rate while conforming to the Ethernet baseband characteristics for the first data rate.

2. The network interface module of claim 1, wherein the Ethernet baseband characteristics include a physical coding sublayer parameter, an error correction coding format, and a signaling format.

3. The network interface module of claim 1, wherein the second signal is received via a second wire of the cable.

4. The network interface module of claim 1, wherein the Ethernet baseband characteristics are for one of 1000BASE-T Ethernet and 10GBASE-T Ethernet.

5. The network interface module of claim 1, wherein:
the physical layer module is configured to perform an autonegotiation process with the network device;
the data rate module is configured to reduce a frequency of a clock signal from a first frequency to a second frequency based on the at least one of (i) the characteristic of the cable, or (ii) results of the autonegotiation process; and
the physical layer module is configured to (i) while the frequency of the clock signal is at the first frequency, transmit the first signal at the first data rate based on the clock signal, and (ii) while the frequency of the clock signal is at the second frequency, transmit the third signal at the second data rate based on the clock signal.

6. The network interface module of claim 1, wherein:
the physical layer module is configured to perform an autonegotiation process with the network device;
the data rate module is configured to determine
a data rate divisor based on (i) the characteristic of the cable, or (ii) results of the autonegotiation process, and
the second data rate based on the data rate divisor; and
the second data rate is equal to the first data rate divided by the data rate divisor.

7. The network interface module of claim 6, further comprising:
a first transmit module configured to (i) receive data, and (ii) generate five-level pulse-amplitude modulation symbols based on the data; and
a second transmit module configured to generate a five-level pulse-amplitude modulation line signal based on (i) the five-level pulse-amplitude modulation symbols, and (ii) the data rate divisor,
wherein the physical layer module is configured to transmit the third signal representing the five-level pulse-amplitude modulation signals on the cable at the second data rate, and
wherein the third signal includes the five-level pulse-amplitude modulation line signal.

8. The network interface module of claim 6, wherein:
the data rate divisor is selected from a set of numbers;
the set of numbers includes numbers that are not divisible by 10; and
the second data rate is not divisible by 10.

9. The network interface module of claim 6, wherein the physical layer module is configured to:
transmit the first signal on the cable using a first number of cable lines; and
transmit the third signal on the cable using a second number of cable lines, wherein the second number of cable lines is equal to the first number of cable lines.

10. A network interface module comprising:
a physical layer module configured to
transmit a first signal to a network device via a cable at a first data rate while conforming to Ethernet baseband characteristics for the first data rate, and
at least one of (i) determine a characteristic of the cable, or (ii) perform an autonegotiation process with the network device; and
a data rate module configured to select a second data rate based on at least one of (i) the characteristic of the cable, or (ii) results of the autonegotiation process, wherein
    the physical layer module is configured to transmit a second signal to the network device at the second data rate while conforming to the Ethernet baseband characteristics for the first data rate,
    the data rate module is configured to determine
        a data rate divisor based on (i) the characteristic of the cable, or (ii) the results of the autonegotiation process, where the second data rate is equal to the first data rate divided by the data rate divisor, and
        the second data rate based on the data rate divisor, and
    during the autonegotiation process
        the physical layer module is configured to (i) transmit a first minimum data rate divisor to the network device, and (ii) receive a second minimum data rate divisor from the network device, and
        the data rate module is configured to (i) determine which of the first minimum data rate divisor and the second minimum data rate divisor is larger, and (ii) select the larger one of the first minimum data rate divisor and the second minimum data rate divisor.

11. The network interface module of claim 10, wherein the autonegotiation process further comprises:
    transmitting a first maximum data rate divisor to the network device;
    receiving a second maximum data rate divisor from the network device;
    transmitting the second signal using the first rate if (i) the first maximum data rate divisor is less than the second minimum data rate divisor, or (ii) the second maximum data rate divisor is less than the first minimum data rate divisor; and
    transmitting the second signal using the second rate if (i) first maximum data rate divisor is greater than the second minimum data rate divisor, or (ii) the second maximum data rate divisor is greater than the first minimum data rate divisor.

12. A method comprising:
    receiving, at a physical layer module, a first signal from a medium access controller;
    transmitting, via one of a plurality of wires of a cable, the first signal from the physical layer module to a network device at a first data rate while conforming to Ethernet baseband characteristics for the first data rate;
    determining a characteristic of the cable;
    measuring characteristics of the cable including the characteristic of the cable determined by the physical layer module, wherein the measured characteristics of the cable comprise
        a length of the cable,
        a signal Quality level of a second signal received via the cable, and
        a measurement of an eye opening of the second signal received via the cable;
    selecting a second data rate based on the measured characteristics of the cable, wherein the second data rate is slower than the first data rate; and
    transmitting a third signal, via the one of the plurality of wires of the cable, from the physical layer module to the network device at the second data rate while conforming to the Ethernet baseband characteristics for the first data rate.

13. The method of claim 12, wherein the Ethernet baseband characteristics include a physical coding sublayer parameter, an error correction coding format, and a signaling format.

14. The method of claim 12, wherein the second signal is received via a second wire of the cable.

15. The method of claim 12, further comprising:
    performing an autonegotiation process with the network device;
    reducing a frequency of a clock signal from a first frequency to a second frequency based on the at least one of (i) the characteristic of the cable, or (ii) results of the autonegotiation process;
    while the frequency of the clock signal is at the first frequency, transmitting the first signal at the first data rate based on the clock signal; and
    while the frequency of the clock signal is at the second frequency, transmitting the third signal at the second data rate based on the clock signal.

16. The method of claim 12, further comprising:
    performing an autonegotiation process with the network device;
    determining a data rate divisor based on (i) the characteristic of the cable, or (ii) results of the autonegotiation process; and
    determining the second data rate based on the data rate divisor, wherein the second data rate is equal to the first data rate divided by the data rate divisor.

17. A method comprising:
    transmitting a first signal from a physical layer module to a network device via a cable at a first data rate while conforming to Ethernet baseband characteristics for the first data rate;
    at least one of (i) determining a characteristic of the cable, or (ii) performing an autonegotiation process with the network device;
    selecting a second data rate based on at least one of (i) the characteristic of the cable, or (ii) results of the autonegotiation process;
    transmitting a second signal from the physical layer module to the network device at the second data rate while conforming to the Ethernet baseband characteristics for the first data rate;
    determining a data rate divisor based on (i) the characteristic of the cable, or (ii) the results of the autonegotiation process;
    determining the second data rate based on the data rate divisor, wherein the second data rate is equal to the first data rate divided by the data rate divisor; and
    during the autonegotiation process
        transmitting a first minimum data rate divisor to the network device,
        receiving a second minimum data rate divisor from the network device,
        determining which of the first minimum data rate divisor and the second minimum data rate divisor is larger, and
        selecting the larger one of the first minimum data rate divisor and the second minimum data rate divisor.

18. The method of claim 17, further comprising, during the autonegotiation process:
    transmitting a first maximum data rate divisor to the network device;
    receiving a second maximum data rate divisor from the network device;
    transmitting the second signal using the first rate if (i) the first maximum data rate divisor is less than the second minimum data rate divisor, or (ii) the second maximum data rate divisor is less than the first minimum data rate divisor; and
    transmitting the second signal using the second rate if (i) the first maximum data rate divisor is greater than the second minimum data rate divisor, or (ii) the second maximum data rate divisor is greater than the first minimum data rate divisor.

\* \* \* \* \*